(12) United States Patent
Meynier

(10) Patent No.: US 8,593,910 B2
(45) Date of Patent: Nov. 26, 2013

(54) PERMANENT SEISMIC SOURCE

(75) Inventor: Patrick Meynier, Chatou (FR)

(73) Assignee: IFP, Rueil-Malmaison (FR)

( * ) Notice: Subject to any disclaimer, the term of this patent is extended or adjusted under 35 U.S.C. 154(b) by 848 days.

(21) Appl. No.: 12/741,613

(22) PCT Filed: Nov. 6, 2008

(86) PCT No.: PCT/FR2008/001569
§ 371 (c)(1),
(2), (4) Date: May 6, 2010

(87) PCT Pub. No.: WO2009/092919
PCT Pub. Date: Jul. 30, 2009

(65) Prior Publication Data
US 2010/0246333 A1    Sep. 30, 2010

(30) Foreign Application Priority Data

Nov. 12, 2007 (FR) ...................... 07 07934

(51) Int. Cl.
*G01V 1/04* (2006.01)
*G01V 1/18* (2006.01)

(52) U.S. Cl.
CPC ........................ *G01V 1/181* (2013.01)
USPC ...................................... 367/185

(58) Field of Classification Search
USPC ...................................... 367/185
See application file for complete search history.

(56) References Cited

U.S. PATENT DOCUMENTS

| | | | |
|---|---|---|---|
| 4,685,091 A * | 8/1987 | Chung et al. | 367/31 |
| 4,754,441 A * | 6/1988 | Butler | 367/157 |
| 4,864,548 A * | 9/1989 | Butler | 367/155 |
| 5,030,873 A | 7/1991 | Owen | |
| 5,111,903 A | 5/1992 | Meynier | |
| 5,135,072 A | 8/1992 | Meynier | |
| 5,239,514 A * | 8/1993 | Winbow et al. | 367/31 |
| 5,550,785 A | 8/1996 | Laurent et al. | |
| 5,769,163 A | 6/1998 | Meynier | |
| 5,801,642 A | 9/1998 | Meynier | |
| 5,810,080 A | 9/1998 | Meynier | |
| 6,023,444 A | 2/2000 | Naville et al. | |
| 6,089,345 A | 7/2000 | Meynier et al. | |
| 6,173,804 B1 | 1/2001 | Meynier | |
| 6,289,985 B1 | 9/2001 | Meynier | |
| 6,325,161 B1 | 12/2001 | Havig | |
| 6,338,394 B1 | 1/2002 | Meynier | |
| 6,412,592 B1 | 7/2002 | Meynier | |
| 6,595,285 B2 | 7/2003 | Dubois et al. | |
| 6,754,136 B2 | 6/2004 | Constantinou et al. | |

(Continued)

FOREIGN PATENT DOCUMENTS

EP    0 433 110 A1    6/1991
GB    2 276 723 A    10/1994

*Primary Examiner* — Isam Alsomiri
*Assistant Examiner* — James Hulka
(74) *Attorney, Agent, or Firm* — Antonelli, Terry, Stout & Kraus, LLP.

(57) ABSTRACT

The present invention relates to a system for emitting seismic waves in an underground formation traversed by a well comprising a casing (10). The system comprises a casing seal (1) allowing passage of a magnetic field, an active part generating seismic waves, made up of magnetic-field active elements (4) and arranged outside the casing seal, and a mobile magnetic field induction source (8) arranged inside the casing seal. The invention also relates to a method implementing the seismic wave emission system.

28 Claims, 2 Drawing Sheets

(56) References Cited

U.S. PATENT DOCUMENTS

| | | |
|---|---|---|
| 6,932,185 B2 | 8/2005 | Bary et al. |
| 7,104,357 B2 | 9/2006 | Baroni et al. |
| 7,325,647 B2 * | 2/2008 | Meynier et al. ............... 181/108 |
| 7,420,879 B2 | 9/2008 | Meynier et al. |
| 2004/0257912 A1 * | 12/2004 | Dubinsky et al. ............... 367/81 |
| 2005/0006088 A1 * | 1/2005 | Abramov et al. .............. 166/249 |
| 2005/0067215 A1 * | 3/2005 | Meynier et al. ................ 181/108 |
| 2005/0098377 A1 * | 5/2005 | Bary et al. ..................... 181/112 |
| 2008/0111431 A1 * | 5/2008 | Dorel .............................. 310/26 |

* cited by examiner (a)

(b)

PERMANENT SEISMIC SOURCE

BACKGROUND OF THE INVENTION

1. Field of the Invention

The present invention relates to permanent seismic wave emission systems and more particularly to a permanent seismic wave emission device based on magnetostrictive materials.

2. Description of the Prior Art

Several types of seismic sources for emitting seismic waves in wells are known. These sources are of different types and involve either an explosion which may be a point or elongated charge with detonating cord wound helically around a rigid mandrel, etc.;

an electric spark which is a breakdown between electrodes in water, a wire explosion under the effect of an electric discharge, etc., a vertical mechanical shock of a mass impacting an anvil secured to a packer that produces, on the well wall, a vertical shear for mainly generating S waves, or a horizontal shock, in a radial direction, of a mass radially driven by hydraulic or electromagnetic a mechanism that contact the well wall at one point.

Seismic waves are also created in wells using controlled vibratory sources of piezoelectric type which are coupled (or not) to the well wall and which emit monofrequencies or codes or frequency modulated signals through a ramp.

These permanently buried seismic sources provide advantages of stability of the source coupling conditions due to the fact that the source is permanently cemented in a dedicated well; insensitivity to the climatic variations of the altered zone when the source is installed below the altered zone; ease of implementation of the source for each acquisition survey; and proximity of the source in relation to the seismic objective to be imaged.

The main drawback of these buried permanent seismic sources is the high installation cost, mainly because a well dedicated to these sources is required. Furthermore, their efficiency is affected by the stiffness of the casing that limits the stress applied to the surrounding medium.

A device for emitting radial elastic waves in a material medium, based on the principle of magnetostriction, is also known. The emission of radial waves is essentially obtained by radially expanding the metallic casing of the well in contact with the material medium under the effect of a magnetic pressure generated by electromagnetic induction with elastic waves being created in the medium under the effect of the radial expansion. The magnetic pressure is obtained by connecting a coil placed in line with the tube to a current generator, a shock generator or a variable frequency generator. The winding pitch of the coil can be constant or variable. The tube can for example be added into a well or a hole, or it can be a tube portion of a cased well. It can also be the lateral wall of a sealed enclosure that is immersed in water for producing acoustic or seismic waves therein.

However, for this type of source, the elongation of the material making up the casing is tens of parts per million. The seismic wave generated is thus very weak and the efficiency of this type of source is therefore not satisfactory enough to be properly used in the industry.

SUMMARY OF THE INVENTION

The present invention overcomes one or more of the drawbacks of the prior art by providing a permanent seismic source that can be installed below the altered zone and that does not require drilling of a well specifically dedicated to seismic prospecting, and having an efficiency compatible with 4D seismic surveys.

The invention provides a system for emitting seismic waves in an underground formation traversed by a well comprising a casing, including a casing seal allowing passage of a magnetic field, an active part generating seismic waves, made up of magnetic-field active elements, disposed outside the casing seal, and a mobile magnetic field induction source disposed inside the casing seal.

The active elements of the seismic wave emission system are made of magnetostrictive materials.

The active elements are bars which are evenly distributed over the circumference of the casing seal and parallel to the casing axis. The ends of each bar rest on two rings mechanically coupled with the formation.

According to an embodiment of the invention, the number of bars ranges between 3 and 10.

According to an embodiment of the invention, the bars are straight.

According to another embodiment of the invention, the bars are curved, have the shape of the stave of a cask with two ends resting upon two rings through two stops fastened to the casing seal.

Circulation of the magnetic field occurs through windows provided in the casing seal at the level of the rings.

According to another embodiment of the invention, circulation of the magnetic field occurs through the two stops.

The zone of the casing seal located between the two rings had magnetic materials.

Mechanical coupling of the rings with the formation is achieved with cement.

The invention also relates to a method using the seismic wave emission system, which activates active elements arranged outside the casing of a well, with a magnetic field emitted by a mobile magnetic field induction source within the casing of the well which passes through the casing of the well.

The invention has application for seismic prospecting or monitoring operations in the subsoil. Seismic prospecting generally emits seismic waves in the subsoil, by one or more seismic sources emits seismic waves and records the reflected waves formation discontinuities with seismic receivers (geophones, hydrophones), for forming seismograms, which are processed to extract therefrom useful information relative to the subsoil geology. The device can be used for example to generate seismic waves within cased wells.

BRIEF DESCRIPTION OF THE FIGURES

Other features and advantages of the invention will be clear from reading the non-limitative description hereafter, illustrated by the accompanying figures wherein.

DETAILED DESCRIPTION

Figure 1:
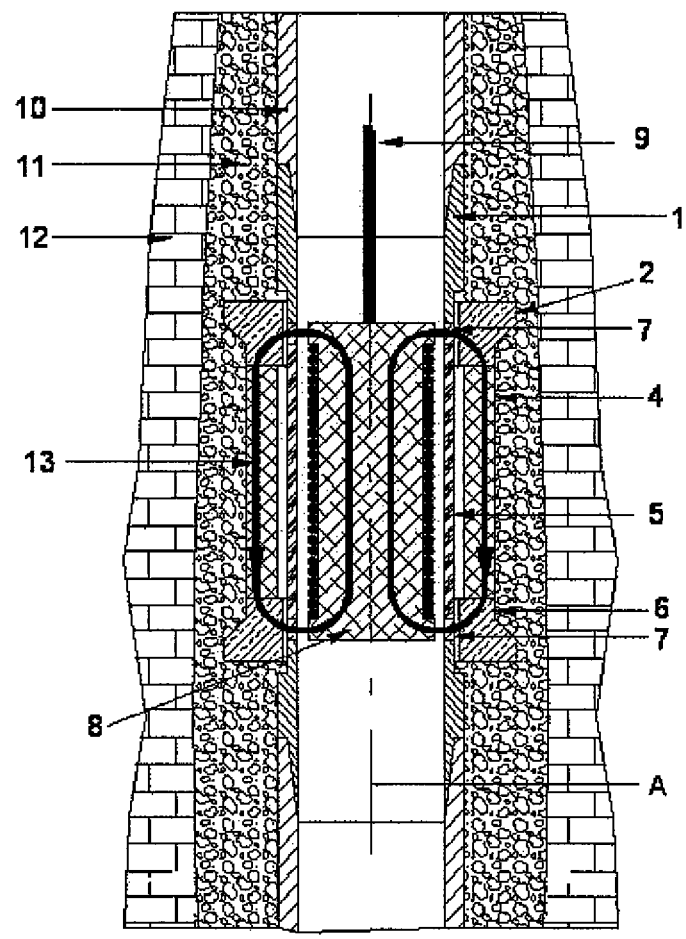
FIG. 1 diagrammatically shows an embodiment of the system according to the invention.

The seismic wave emission system according to the invention is described in connection with FIGS. 1 and 2.

The seismic wave emission system according to the invention is integrated in a well or any other cavity of the same type to be equipped with seismic sources. The well comprises a set of casing seals (1) making up casing (10) that is included in the completion of the well. The system is thus integrated at the level of one of these casing seals (1).

The system according to the invention comprises an active part generating the seismic waves, which is activated by a mobile magnetic field induction source (8).

The active part of the device has active elements generating the seismic waves, made up of several bars (4) arranged parallel to the casing axis (A). These bars have a cross-section of any shape. The bars are evenly arranged over the circumference of casing seal (1) and outside casing seal (1). The device comprises 3 to 10 bars, preferably 4 to 8 bars and more preferably 4, 6 or 8 bars.

The materials used for these bars are magnetostrictive materials, GMMs (Giant Magnetostrictive Materials), such as Terfenol-D produced by the ETREMA® Company (United States). When they are subjected to a magnetic field, these materials can elongate by 1500 ppm. According to the invention, the source can comprise yet more effective materials such as the MSM magnetic shape memory materials, for example the Ni—Mn—Ga alloy marketed by the AdaptaMat Company (Finland). When they are subjected to a magnetic field, these materials can elongate by 100,000 ppm.

The ends of each bar (4) rest on two rings (2) and (6) fastened with cement (11), reinforcing the well, between casing seal (1) and formation (12) or medium (12) surrounding the well. Rings (2) and (6) are thus mechanically coupled to formation (12) by cement (11). Any other equivalent material can be used in place of cement to fasten the rings.

In a first embodiment of the invention, bars (4) are straight and they preferably have a circular cross-section. Rings (2) and (6) are embedded in cement and therefore are held in place in cement (11) along casing seal (1). In order to facilitate setting of the device upon well construction, one (2) of the rings can be fastened to the casing seal. Thus, when pouring the cement around the formation, active elements (4) are held in place.

Thus, when bars (4) made of active material are subjected to magnetic field (13), generated by a mobile induction source (8), they elongate. The elongation of the bars depends on the type of magnetostrictive material used. This elongation exerts a longitudinal pressure with respect to the casing axis (A) on the rings, which thus causes stresses in cement (11) surrounding the casing. These stresses then generate seismic waves that propagate in cement (11) and in surrounding medium (12). The seismic wave propagation mechanism is known in the art. In this variant, the deformation of the bars thus causes longitudinal stresses with respect to the casing axis in cement (11). The seismic waves which are generated are recorded by seismic pickups and will be used by geophysicists to detect, among other things, the hydrocarbon level variations in the reservoirs or the gas volumes in $CO_2$ storage sites.

The inducing tool, which has a coil (8) and of an electro-carrying linking cable (9) connecting it to the surface, induces a magnetic field (13) used to cause expansion of the active material bars. Coil (8) is lowered into the well, by means of cable (9), only during seismic acquisition surveys. The rest of the time, the inside of the casing is free for other uses, production, logging, etc.

The method implementing the system according to the invention thus activates active elements (4) of the seismic wave emission system arranged outside casing seal (1), with a mobile source located within casing seal (1) during seismic measuring operations, through well casing (1).

Coupling of the mobile induction source (8), temporarily located within casing seal (1), with the permanent part of the device located outside casing seal (1), is performed through the wall of casing seal (1) that allows passage of the magnetic field. Circulation of the magnetic field induced by the coil thus occurs through windows (7) provided in casing seal (1) and arranged at the level of rings (2) and (6).

Casing seal (1), that supports the source, is generally made of steel and it can be optimized to improve the magnetic coupling between coil (8) and active material bars (4). The steel of the casing seal is therefore replaced, at the level of bars (4), by a zone (5) made of a magnetic materials (relative permeability close to 1) known to persons skilled in the art to avoid any magnetic flux loss in the casing. Similarly, in order to limit losses, the magnetic circuit can be optimized through the use of materials of high magnetic permeability for rings (2) and (6) arranged at both ends of bars (4), and for windows (7) integrated to casing seal (1), which belong to the magnetic circuit of the seismic source.

Figure 3:
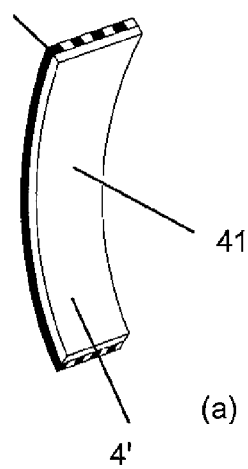
FIGS. 3 (*a*) and (*b*) diagrammatically show elements of the system shown in FIG. 2.
Figure 3:
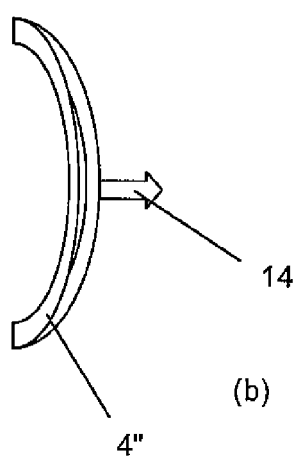

In a second embodiment of the invention, the active elements or bars made of magnetostrictive materials are curved in the shape of bent plates or cask staves (4') illustrated in FIG. 3a. The bars can also be split lengthwise (4'') as illustrated in FIG. 3b. The curvature of the bars is oriented towards the outside of casing seal (1). In another embodiment, the curvature can be oriented towards the inside of casing seal (1). As in the first variant of the invention, these bars are evenly arranged over the circumference of casing seal (1) and outside casing seal (1). The device comprises 3 to 10 bars, preferably 4 to 8 bars and more preferably 4, 6 or 8 bars.

These elements rest on rings (2) and (6) through stops (3) fastened to casing seal (1). Rings (2) and (6) and stops (3) are embedded in the cement surrounding the well.

When magnetic field (13) induced by coil (8) flows through the stave-shaped elements, the latter elongate through magnetostrictive effect. The elongation being limited by stops (3), active element (4) deforms perpendicularly to the casing axis due to its concave shape. Thus, unlike the first variant, the deformation of the bars causes radial stresses, with respect to the casing axis, in the cement.

Figure 2:
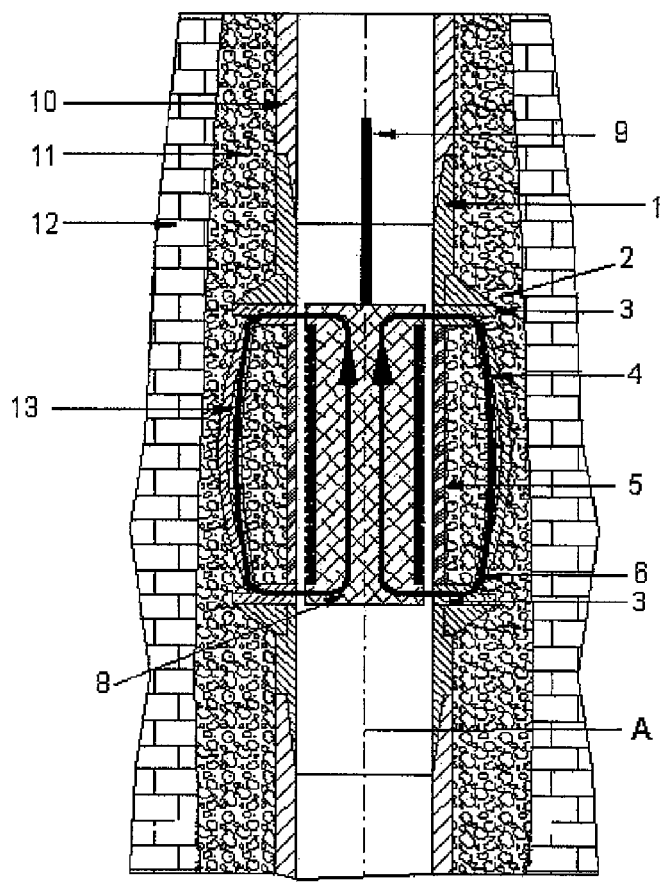
FIG. 2 diagrammatically shows another embodiment of the system according to the invention.

In this variant, magnetic field (13) circulates either through windows (7) or through stops (3) as illustrated in FIG. 2. In this case, stops (3) are based on materials of maximum magnetic permeability.

The deformation is transmitted to cement (11) and then to soil (12) which generates a seismic wave that can be used as a source for seismic acquisitions.

The active elements having the shape of plates or of cask staves (4') can be a bimetallic strip made up of an inner supporting plate (41), made of titanium for example, and of an outer layer (42) made up of prismatic elements made of magnetostrictive material which are attached together and attached onto the titanium supporting plate.

In another variant of the invention, several devices can be integrated in the completion of one well at different depths and can be used alternately while lowering the inducing source into the well or the formation.

The permanent seismic emission device can for example be integrated in the casing of production or observation wells provided in the development plan of oil reservoirs or the storage of hydrocarbons under observation by means of the 4D seismic method since the mobile induction source is set within the well only during seismic prospecting or monitoring operations.

It is clear that the present invention is not limited to the details given above and that it allows embodiments in many other specific forms without departing from the field of application of the invention. The present embodiments should therefore be considered by way of illustration and they can be modified without however departing from the scope defined by the accompanying claims.

The invention claimed is:

1. A system for emitting seismic waves in an underground formation traversed by a well comprising:
    a well casing associated with the well, a casing seal for allowing passage of a magnetic field outside of the casing seal, an active part for generating seismic waves including active elements disposed outside the casing seal which are activated by the magnetic field which cause deformation thereof which provides generation of the seismic waves and a mobile magnetic field induction source disposed inside the casing seal.

2. A seismic wave emission system as claimed in claim 1, wherein the active elements comprise magnetostrictive materials.

3. A seismic wave emission system as claimed in claim 2, wherein the active elements comprise bars evenly distributed over the circumference of the casing seal and parallel to a casing axis, ends of each bar resting on two rings and mechanically coupled with the formation.

4. A seismic wave emission system as claimed in claim 3, wherein bars number between 3 and 10.

5. A seismic wave emission system as claimed in claim 4, wherein the bars are straight.

6. A seismic wave emission system as claimed in claim 4, wherein the bars are curved in a shape of a cask stave and have ends each respectively contacting a stop which contacts a ring fastened to the casing seal.

7. A seismic wave emission system as claimed in claim 3, wherein the bars are straight.

8. A seismic wave emission system as claimed in claim 7, wherein the bars are curved in a shape of a cask stave and have ends each respectively contacting a stop which contacts a ring fastened to the casing seal.

9. A seismic wave emission system as claimed in claim 3, wherein the bars are curved in a shape of a cask stave and have ends each respectively contacting a stop which contacts a ring fastened to the casing seal.

10. A seismic wave emission system as claimed in claim 2, wherein the bars are straight.

11. A seismic wave emission system as claimed in claim 10, wherein the bars are curved in a shape of a cask stave and have ends each respectively contacting a stop which contacts a ring fastened to the casing seal.

12. A seismic wave emission system as claimed in claim 2, wherein the bars are curved in a shape of a cask stave and have ends each respectively contacting a stop which contacts a ring fastened to the casing seal.

13. A seismic wave emission system as claimed in claim 1, wherein the active elements comprise bars evenly distributed over the circumference of the casing seal and parallel to a casing axis, ends of each bar resting on two rings and mechanically coupled with the formation.

14. A seismic wave emission system as claimed in claim 13, wherein bars number between 3 and 10.

15. A seismic wave emission system as claimed in claim 14, wherein the bars are straight.

16. A seismic wave emission system as claimed in claim 15, wherein the bars are curved in a shape of a cask stave and have ends each respectively contacting a stop which contacts a ring fastened to the casing seal.

17. A seismic wave emission system as claimed in claim 14, wherein the bars are curved in a shape of a cask stave and have ends each respectively contacting a stop which contacts a ring fastened to the casing seal.

18. A seismic wave emission system as claimed in claim 13, wherein the bars are straight.

19. A seismic wave emission system as claimed in claim 18, wherein the bars are curved in a shape of a cask stave and have ends each respectively contacting a stop which contacts a ring fastened to the casing seal.

20. A seismic wave emission system as claimed in claim 13, wherein the bars are curved in a shape of a cask stave and have ends each respectively contacting a stop which contacts a ring fastened to the casing seal.

21. A seismic wave emission system as claimed in claim 1, wherein the bars are straight.

22. A seismic wave emission system as claimed in claim 21, wherein the bars are curved in a shape of a cask stave and have ends each respectively contacting a stop which contacts a ring fastened to the casing seal.

23. A seismic wave emission system as claimed in claim 1, wherein the bars are curved in a shape of a cask stave and have ends each respectively contacting a stop which contacts a ring fastened to the casing seal.

24. A seismic wave emission system as claimed in claim 23, wherein circulation of the magnetic field occurs through windows provided in the casing seal which are opposed to the rings.

25. A seismic wave emission system as claimed in claim 23, wherein circulation of the magnetic field occurs through both stops.

26. A seismic wave emission system as claimed in claim 23, wherein a zone of the casing seal which is located between the rings includes a magnetic materials.

27. A seismic wave emission system as claimed in claim 23, comprising:
    a mechanical coupling of the rings with the formation including cement.

28. A method in a system including a well casing, a casing seal associated with the well for allowing passage of a magnetic field outside of the casing, an active part for generating seismic waves, including active elements disposed outside the casing seal, which are activated by the magnetic field which cause deformation thereof which provides generation of the seismic waves and a mobile magnetic field induction source disposed inside the casing seal, comprising:
    activating the active elements disposed outside the casing of a well with a magnetic field emitted by the mobile magnetic field induction source disposed within the casing of the well.

* * * * *